(12) United States Patent
Coffield

(10) Patent No.: US 6,511,562 B1
(45) Date of Patent: Jan. 28, 2003

(54) BONDING STRIP FOR LOAD BEARING FABRIC

(75) Inventor: Timothy P. Coffield, Grand Rapids, MI (US)

(73) Assignee: Dahti, Inc., Grand Rapids, MI (US)

(*) Notice: Subject to any disclaimer, the term of this patent is extended or adjusted under 35 U.S.C. 154(b) by 76 days.

(21) Appl. No.: 09/656,491

(22) Filed: Sep. 6, 2000

(51) Int. Cl.[7] .............................. A47C 4/30; B32B 9/04; B32B 31/00

(52) U.S. Cl. .................. 156/66; 156/196; 156/227; 297/218.3; 297/218.5; 297/440.11; 297/226; 5/110

(58) Field of Search ........................ 5/110, 127, 657; 156/66, 228, 229, 276, 278, 288, 296, 107, 108, 196, 227; 267/131; 297/440.11, 440.13; 160/384, 391, 395, 402, 403; 428/99

(56) References Cited

U.S. PATENT DOCUMENTS

| 265,302 A | * 10/1882 | Brigham ............... 156/216 |
| 614,235 A | 11/1898 | Palmer |
| 662,647 A | 11/1900 | Howe |
| 1,120,686 A | 12/1914 | Burrowes |
| 1,233,314 A | * 7/1917 | Costello ............... 160/395 |
| 3,041,109 A | 6/1962 | Eames et al. |
| 3,165,359 A | 1/1965 | Ashkouti |
| 3,208,085 A | 9/1965 | Grimshaw |
| 3,214,314 A | 10/1965 | Rowbottam |
| 3,298,743 A | 1/1967 | Albinson et al. |
| 3,498,668 A | * 3/1970 | Vanderminden, III ........ 297/45 |
| 3,601,446 A | 8/1971 | Horby |
| 3,640,576 A | 2/1972 | Morrison et al. |
| 3,844,612 A | 10/1974 | Borggren et al. |
| 3,999,802 A | 12/1976 | Powers |
| 4,062,590 A | 12/1977 | Polsky et al. |
| 4,670,072 A | 6/1987 | Pastor et al. |
| 4,796,955 A | 1/1989 | Williams |
| 4,815,499 A | 3/1989 | Johnson |
| 4,826,249 A | 5/1989 | Bradbury |
| 4,842,257 A | 6/1989 | Abu-Isa et al. |
| 4,928,334 A | 5/1990 | Kita |
| 4,939,183 A | 7/1990 | Abu-Isa et al. |
| 4,946,224 A | 8/1990 | Leib |
| 5,009,827 A | 4/1991 | Abu-Isa et al. |
| 5,013,089 A | 5/1991 | Abu-Isa et al. |
| 5,176,860 A | 1/1993 | Storch |
| 5,178,815 A | 1/1993 | Yokote et al. |
| 5,288,136 A | 2/1994 | Webber et al. |
| 5,318,348 A | 6/1994 | Hess |
| 5,503,455 A | 4/1996 | Yang |
| 5,662,383 A | 9/1997 | Hand |
| 6,059,368 A | 5/2000 | Stumpf et al. |

FOREIGN PATENT DOCUMENTS

| CA | 653100 | 11/1962 |
| SU | 1065262 | 1/1984 |

* cited by examiner

Primary Examiner—Richard Crispino
Assistant Examiner—Chan Sing B
(74) Attorney, Agent, or Firm—Warner Norcross & Judd

(57) ABSTRACT

A bonding strip that functions as a carrier for a load bearing fabric. The bonding strip includes a pair of bonding strip halves that sandwich the fabric. The bonding strip halves are intersecured by an adhesive that extends through and is intimately interconnected with the fabric. The bonding strip halves each define at least one bonding groove. The adhesive extends into the bonding grooves to mechanically interconnect the adhesive, the bonding strip halves and the fabric.

17 Claims, 7 Drawing Sheets

BONDING STRIP FOR LOAD BEARING FABRIC

BACKGROUND OF THE INVENTION

The present invention relates to load bearing fabric, and more particularly to attachment components and methods for securing load bearing fabric to a support structure.

The term "load bearing fabric" is commonly used to refer to a class of high strength, highly durable textiles that are typically woven from elastomeric monofilaments and conventional yarns. Some of today's conventional load bearing fabrics have greater strength and durability characteristics than spring steel and other conventional load bearing materials. In addition to their strength and durability characteristics, load bearing fabrics are lightweight and typically have a high modulus of elasticity. Because of the inherent elasticity, load bearing fabrics do not require cushioning like conventional rigid load bearing structures. Therefore, load bearing fabrics are well-suited for use in a variety of applications where a strong and durable yet lightweight or elastic load bearing surface is desired, for example, in seating, cots and wheelchair applications. Further, load bearing fabrics are aesthetically pleasing and can be exposed during use, for example, as the seat or back of an office chair. The use of load bearing fabrics continues to increase dramatically with the continued development of stronger, more durable and aesthetically pleasing fabrics.

One particularly important challenge related to the use of load bearing fabric is the attachment of the fabric to the support structure. Although load bearing fabrics have high strength and durability characteristics, they must be properly attached to the support structure to provide an end product with the desired strength and durability. Conventional attachment methods often fail to provide the necessary strength and durability to withstand the forces applied to the fabric. As a result, the fabric separates from the support structure under conditions that the fabric is otherwise well-suited to survive. In some applications, the bond itself may fail and in other applications, the method of attachment may cause the textile to unravel or separate along the periphery of the fabric. Accordingly, there is an ongoing effort to develop new and improved methods and components for securing the load bearing fabric to the support structure.

Typically, load bearing fabrics are secured to a support structure by a carrier, often in the form of a peripheral frame. The fabric is first attached to the carrier and then the carrier is attached to the support structure using fasteners or other conventional techniques and apparatus. In such applications, the challenge is to intersecure the fabric and carrier in a way that provides a strong and durable bond without damaging or promoting unraveling of the fabric. One conventional method for securing load bearing fabric to a carrier includes the use of encapsulation. In general, encapsulation involves the molding of a carrier about the peripheral edge of the fabric in an in-molding process. During the molding process, the material of the carrier flows through (e.g. through the spaces between the warps and wefts of the fabric) and becomes intimately intersecured with the fabric. Although encapsulation typically provides a strong, durable bond between the fabric and the carrier, it requires expensive molding machinery.

The fabric can also be attached to the carrier or directly to the support structure by heat fusion. An example of this process is described in U.S. Pat. No. 4,928,334 to Kita entitled Joint Structure For Fabric Web Having High Modulus Of Elasticity. In this process, the fabric is looped around a rod and is folded back onto itself. A heat-fusible resin film is disposed between the folded and unfolded layers, and the two layers are fused together using high-frequency welding. The resulting bond is relatively strong and is not prone to unraveling; however, it is relatively complex in that it requires the use of high-frequency welding apparatus. This process is also limited for use with applications where the fabric can be folded back onto itself, thereby limiting the construction and configuration of the frame as well as the shape and design of the fabric.

Another method for securing the fabric to the support structure is to sew the fabric to the carrier or to the support structure. Sewing can also be used in applications where the fabric is looped or wrapped around a carrier or a support structure and then sewn back onto itself. Although relatively inexpensive, these sewing methods suffer in that sewing randomly damages the structural threads of the fabric, and consequently weakens the fabric and the attachment.

Another conventional attachment method is to adhesively secure the fabric to the carrier or directly to the structural support. For an adhesive bond to provide sufficient strength and durability for conventional applications, the fabric must be wrapped around the carrier or the support structure and then adhesively secured back onto itself, much like the fused construction described above. Primarily as a result of the friction between the fabric and the carrier, this "wrapped" construction dramatically reduces the amount of forces that must be borne by the adhesive bond. Although adhesive is relatively inexpensive, this method requires substantial labor and provides an aesthetically undesirable part, suitable only as a class "B" surface (i.e. a surface that must be covered).

SUMMARY OF THE INVENTION

The aforementioned problems are overcome by the present invention wherein a bonding strip is provided with bonding grooves that receive an adhesive to create mechanical and adhesive connections between the bonding strip and the fabric. The bonding strip includes a pair of bonding strip halves that are sandwiched about the fabric and are intersecured by an adhesive. The inner surfaces of the bonding strip halves are shaped to define bonding grooves that are filled with adhesive as the bonding strip halves are secured to the fabric. The adhesive cures within the bonding grooves and the spaces within the fabric to provide a strong, mechanical bond between the fabric, the adhesive and the bonding strip halves.

In a preferred embodiment, the bonding grooves are dovetailed or otherwise undercut in cross-sectional shape to provide enhanced mechanical resistance to separation of the adhesive from the bonding strip halves. The undercut cross-sectional shape is particularly helpful in resisting the component of separation forces that extend perpendicular to the plane of the fabric.

The present invention also discloses a method for attaching a load bearing fabric to a support structure. The method generally includes the steps of (a) providing a pair of bonding strip halves, each half defining bonding grooves adapted to receive adhesive, (b) applying an adhesive to one or more of the bonding strip halves, (c) closing the bonding strip halves about the fabric, whereby the adhesive flows through the fabric and into the bonding grooves in both bonding strip halves, (d) permitting the adhesive to cure to create adhesive and mechanical bonds between the fabric and the bonding strip halves and (e) securing the bonding strip to the support structure.

The present invention provides a simple and effective method for attaching a bonding strip to a load bearing fabric. The combination of mechanical and adhesive bonds between the bonding strip, adhesive and fabric provides a strong and durable interconnection. Also, the bonding grooves increase the surface area of the bonding strip that is in contact with the adhesive, thereby increasing the strength of the adhesive bond between the adhesive and the bonding strips halves. The bonding strip halves can be inexpensively manufactured using conventional extrusion or molding equipment. Further, the bonding strip halves can be easily secured to the fabric with adhesive using conventional jigs and fixtures. An additional benefit of the present invention is that it provides a class "A" surface (i.e. one that does not require covering) because the adhesive is sandwiched between the bonding strip halves. Accordingly, the present invention provides for an attractive and inexpensive yet strong and highly durable attachment.

These and other objects, advantages, and features of the invention will be readily understood and appreciated by reference to the detailed description of the preferred embodiment and the drawings.

DETAILED DESCRIPTION OF THE PREFERRED EMBODIMENT

Figure 1A:
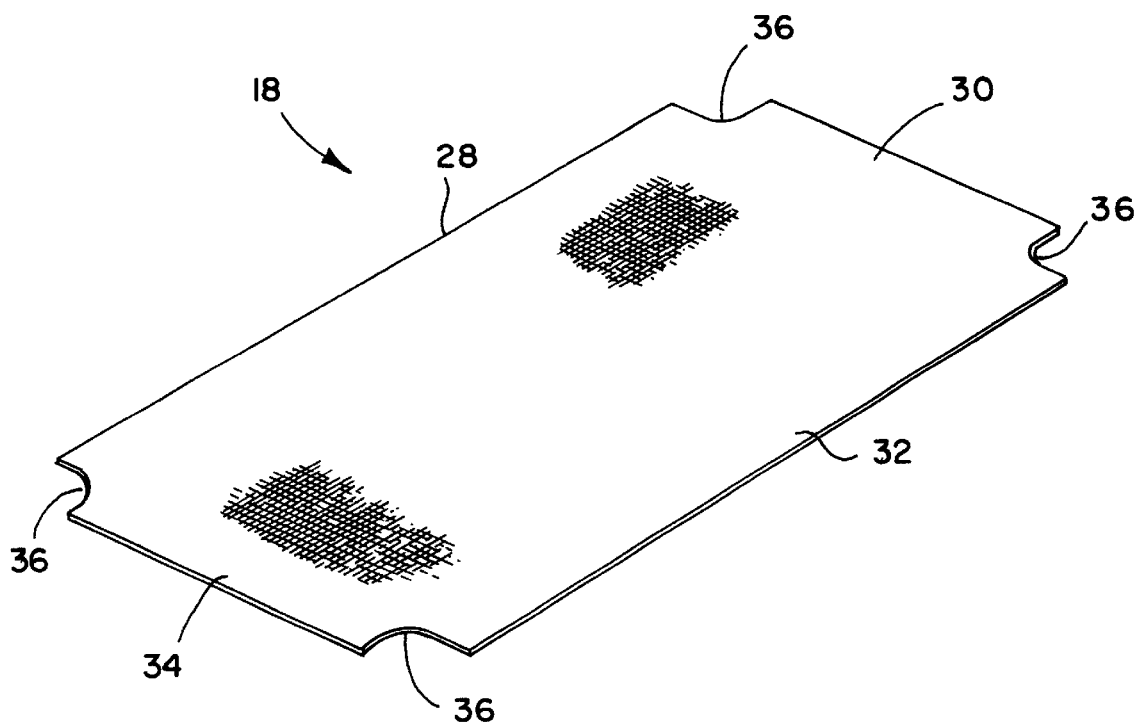
FIG. 1A is a perspective view of a section of load bearing fabric cut in accordance with a preferred embodiment of the present invention.
Figure 1B:
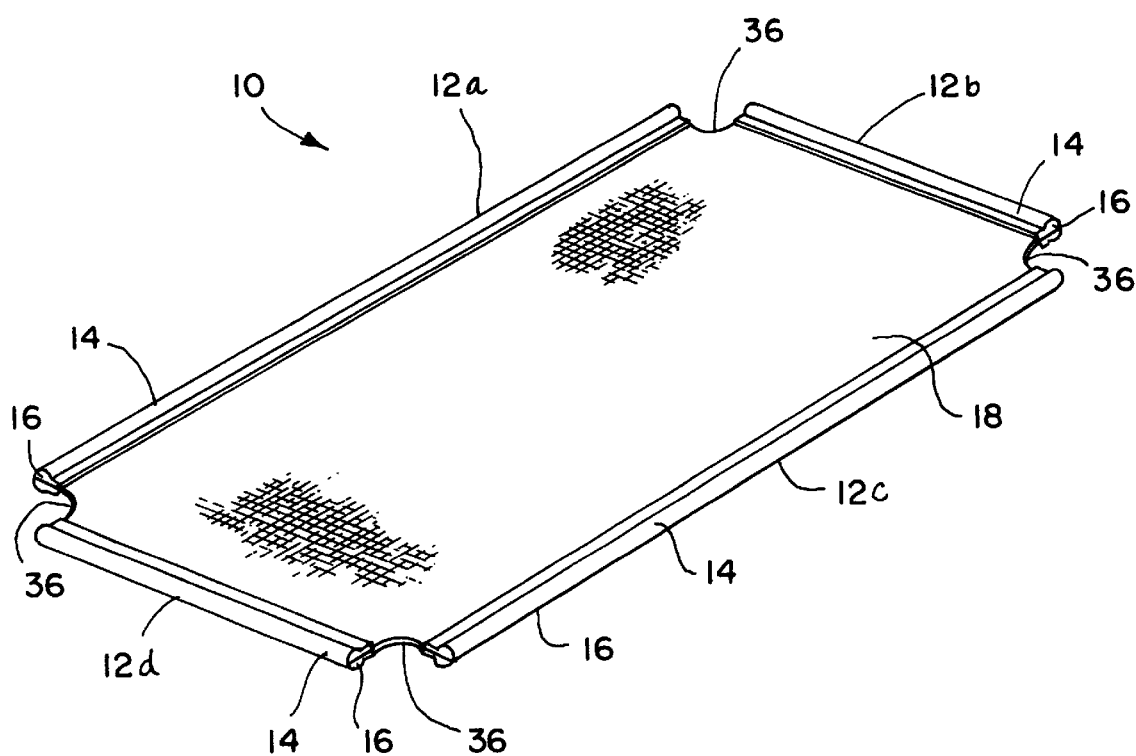
FIG. 1B is a perspective view of an assembly including the section of fabric with attached bonding strip in accordance with a preferred embodiment of the present invention.
Figure 1C:
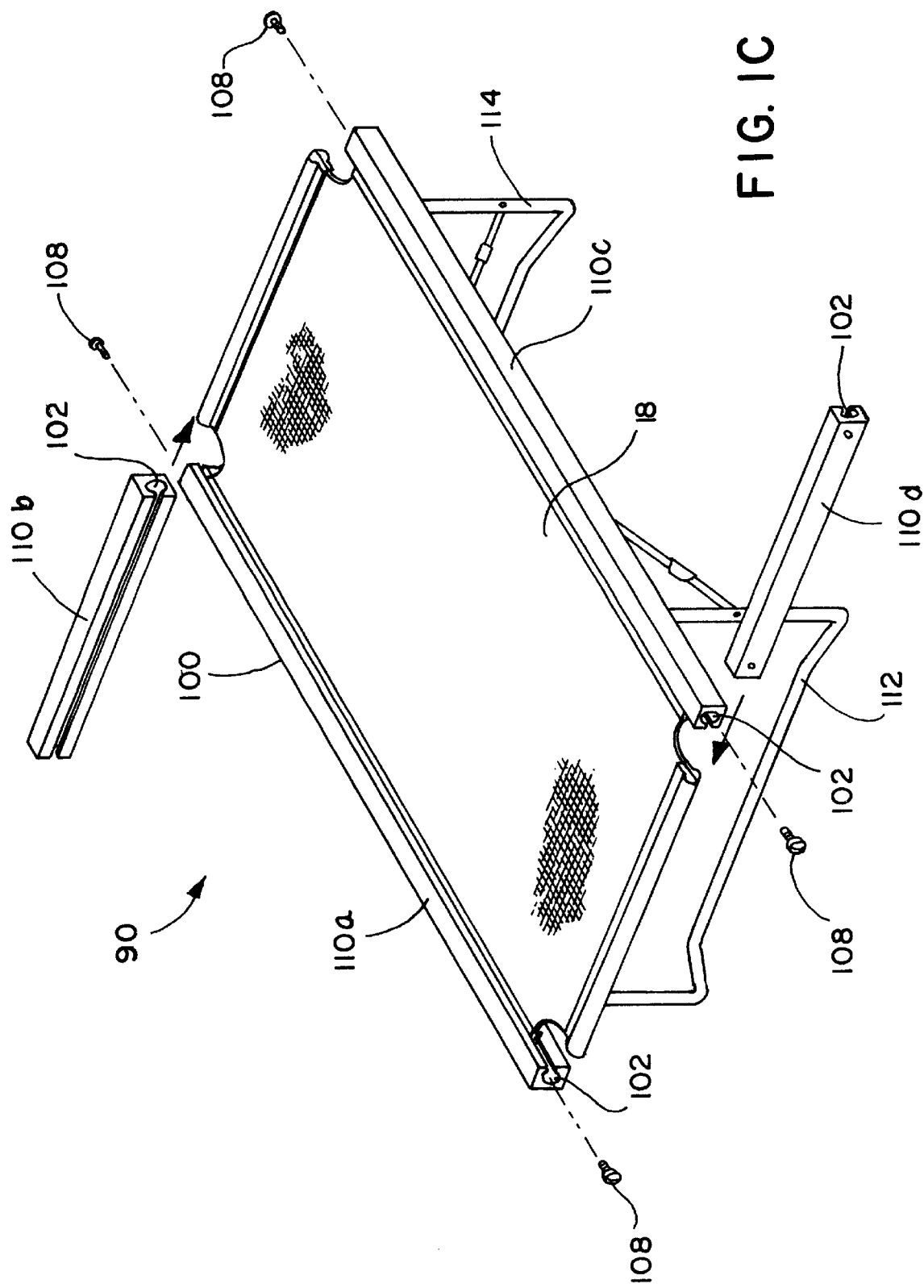
FIG. 1C is a perspective, partially exploded view of a cot incorporating the assembly in accordance with a preferred embodiment of the present invention.

For purposes of disclosure, and not as a limitation, the present invention is described in connection with a rectangular section of fabric intended for use in the manufacture of a cot or other similar rectangular article. The present invention is, however, well-suited for use in the attachment of load bearing fabrics in a wide variety of applications, such as office, home and automotive seating applications. An assembly of a load bearing fabric and bonding strip manufactured in accordance with a preferred embodiment of the present invention is shown in FIGS. 1A–C, and generally designated 10. The present invention generally includes four substantially linear bonding strips 12a–d that are secured to the four peripheral edges of the fabric 18. Each bonding strip 12a–d includes opposed bonding strip halves 14 and 16 that are sandwiched about the peripheral edge of the fabric 18. An adhesive 20 is disposed between the bonding strip halves 14 and 16 to mechanically and adhesively interconnect the bonding strip halves 14 and 16 and the fabric 18. It will be readily apparent to those skilled in the art that the bonding strip may take on different forms and shapes, for example, to follow the peripheral edges of a circular or complex shaped fabric. The terms "inner," "outer," "inwardly" and "outwardly" are used in this application to refer to directions relative to the fabric, such that "outwardly" means away from the center of the fabric.

Figure 2:
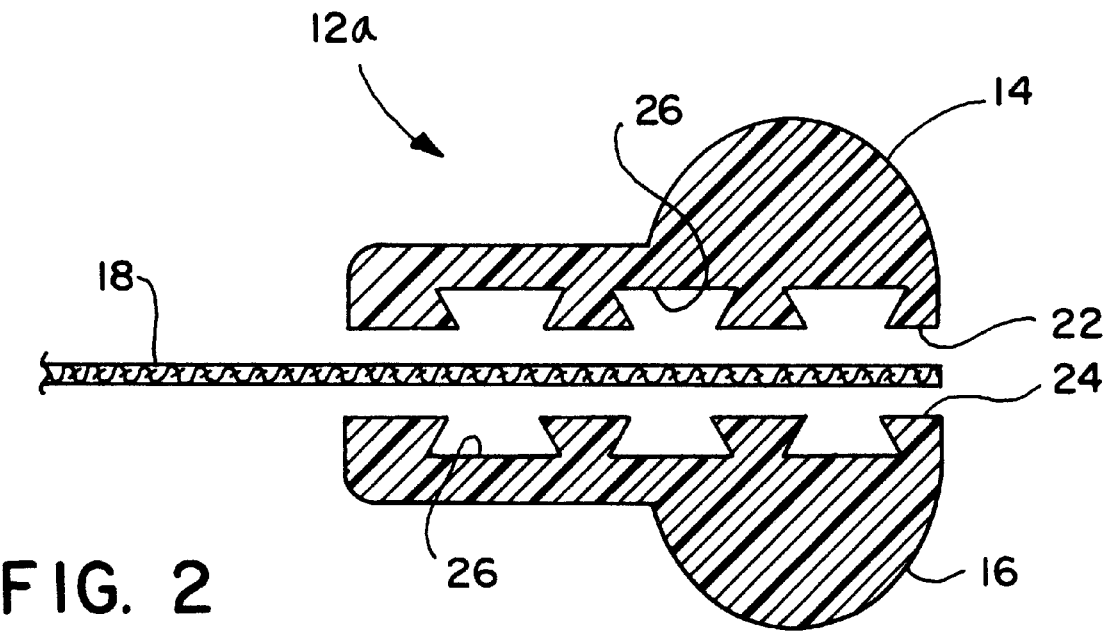
FIG. 2 is an exploded, sectional view of the fabric and bonding strip halves.

In the described embodiment, the fabric 18 is adapted to form the support surface for a rectangular cot 90 (See FIG. 1C). The cot 90 is generally conventional and therefore will not be described in detail. Suffice it to say, however, that the cot 90 includes a peripheral frame 100 supported atop a pair of folding legs 112 and 114. The frame 100 includes four substantially linear segments 110a–d and is adapted to receive the bonding strips 12a–d. As shown in FIG. 2, each segment 110a–d of the peripheral frame 100 defines a channel 102 adapted to slidably receive the corresponding bonding strips 12a–d in a conventional manner. Alternatively, the bonding strips 12a–d can be secured directly to the frame by screws, bolts or other conventional fasteners. The peripheral frame 100 may be expanded or spread after insertion (or other attachment) of the bonding strips 12a–d to stretch or draw the fabric tight in a conventional manner. Alternatively, the frame 100 may be rigid and the fabric 18 may be stretched as an integral part of its attachment to the frame 100. For the sake of simplicity, the described frame 100 is a rigid, non-folding frame. The rigid frame 100 may, however, be replaced by a hinged, foldable frame (not shown) in a conventional manner by providing breaks in the bonding strips 12a–d at the locations of the hinges.

As perhaps best shown in FIG. 1A, the load bearing fabric 18 of the described embodiment is a generally rectangular piece of conventional load bearing fabric having four peripheral edges 28, 30, 32 and 34. The fabric 18 preferably includes quarter-circle cutouts 36 defined in each corner to separate the adjacent, peripheral edges of the fabric and provide a neat and tidy appearance to the completed product. The load bearing fabric 18 is typically premanufactured and is preferably one of a variety of load bearing fabrics available from well-known suppliers. For example, the fabric 18 may be manufactured from Dymetrol fabric available from Acme Mills of Detroit, Mich.; Pellicle fabric available from Quantum Inc. of Colfax, N.C.; Collage fabric available from Matrix of Greensboro, N.C. or Flexnet fabric available from Milliken of Spartanburg, S.C. The present invention is also well-suited for use with other load bearing fabrics, including "welded" fabrics in which the warps and wefts of the fabric are welded, fused or otherwise intersecured. In fact, where cost of the fabric is less of a factor, welded fabrics may be preferred as the welded fabric provides an improved mechanical bond with the adhesive.

Referring now to FIG. 1B, the assembly 10 preferably includes four bonding strips 12a–d secured to the four peripheral edges 28, 30, 32 and 34 of the rectangular-shaped fabric 18. Each bonding strip 12a–d includes a pair of bonding strip halves 14 and 16 that are sandwiched about the fabric 18 immediately adjacent the periphery of the fabric 18. In the described embodiment, the bonding strip halves 14 and 16 are substantially linear, longitudinally extended members. As shown in FIG. 2, each bonding strip half 14 and 16 includes an inner surface 22 and 24 that faces toward the fabric 18. The inner surfaces 22 and 24 are shaped to define bonding grooves 26 adapted to receive an adhesive 20 (See FIG. 3). The bonding grooves 26 preferably extend in a direction substantially perpendicular to the direction of the force that will eventually be applied to the fabric 18. The bonding grooves 26 preferably extend along substantially the entire length of the bonding strip halves 14 and 16 and are preferably dovetailed or otherwise undercut in cross section to improve the mechanical bond between the adhesive and the bonding strip half 14 or 16. The bonding grooves 26 of the two bonding strip halves 14 and 16 are preferably disposed directly opposite each other to permit a relatively large mass of adhesive to cure in a plug-like or spline-like configuration extending through the fabric 18 and into each bonding strip half 14 and 16. A variety of alternative cross-sections for the bonding trip halves are shown in FIGS. 4–7. Each of these FIGS. shows an upper bonding strip half 214, 14, 414 and 514 having bonding grooves 226, 326, 426 and 526. The corresponding lower bonding strip half (not shown) for each of these alternatives is preferably the mirror image of the illustrated upper bonding strip half. Not only the cross-sectional shape, but also the number of grooves can vary from application to application as desired. Because of the strength of the mechanical bond, the bonding strips 12a–d can be manufactured from conventional elastomers, such as Hytrel or PVC. As another alternative, the bonding grooves can be replaced by male protrusions or other shapes that result in mechanical interlock between the adhesive and the bonding strip. For example, the bonding groove can be replaced by one or more continuous, undercut ribs (not shown) or by a plurality of distinct, undercut male components protruding from the inner surface (not shown).

In the described embodiment, the bonding strip halves 14 and 16 are shaped to provide the assembled bonding strip 12 with a bulbous edge 40 that facilitates attachment of the fabric and bonding strip assembly 10 to the peripheral frame 100. The bulbous edge 40 is adapted to be slidably fitted within the channel 102 of the peripheral frame 100, for example, by aligning the bulbous edge 40 with the axial end of the channel 102 and sliding the bonding strip 12 axially into the channel 102. The edge 40 preferably corresponds in shape with the interior of channel 102 to provide a snug fit. Alternatively, the bonding strip 12 can include integral features, male or female, to permit securing of the bonding strip 12 to the peripheral frame 100 of the support structure. For example, the bonding strip 12 can be formed with screw holes, tabs, snaps, button holes or slots that mate with corresponding elements on the peripheral frame 100.

The load bearing fabric 18 and bonding strip halves 14 and 16 are intersecured by adhesive 20. The adhesive 20 extends through the warps and wefts of the fabric 18 to become intimately interconnected with the fabric 18. The adhesive also fills the bonding grooves 26 so that once cured it creates a mechanical interconnection that cooperates with the adhesive connection to create a high strength and high durability attachment. In essence, the cured adhesive 20 defines a plurality of spline-like ridges that, in addition to the adhesive connection, are intimately attached to the fabric 18 and mechanically interlocked with the bonding strip halves 14 and 16. Adhesive 20 is preferably a conventional urethane adhesive having a cycle time of 5 minutes or less. Those skilled in the art will readily appreciate that the urethane adhesive can be replaced other conventional adhesives.

Manufacture and Attachment

The present invention in manufactured using generally conventional techniques and apparatus. As noted above, the fabric 18 is preferably one of a variety of pre-manufactured load bearing fabrics available from a wide variety of well-known suppliers, and is preferably woven or knit using conventional weaving techniques and apparatus. The precise weave of the fabric will vary from application to application depending on the characteristics desired in the fabric. The load bearing fabric 18 is then cut to the desired shape using conventional techniques and apparatus, such as a conventional die cutting apparatus.

The bonding strip halves 14 and 16 are preferably extruded from a conventional elastomer, such as Hytrel or PVC, using conventional extrusion techniques and apparatus. Alternatively, the bonding strip halves 14 and 16 can be molded or machined to the desired shape. The bonding strip halves 14 and 16 are preferably separate segments cut from a single continuous extrusion. One of the two segments is flipped longitudinally with respect to the other 50 that their inner surfaces 22 and 24 are in face-to-face relation and the two segments are symmetrically about the line of the fabric 18.

The attachment process may be performed manually or using conventional automation. First, the lower bonding strip halves 16 for each of the bonding strip segments 12a–d are placed into a bonding fixture (not shown) with their inner surfaces 24 facing upwardly. Next, a bead of adhesive 20 is applied along the entire length of the bonding strip halves 16. The adhesive is preferably a hot melt adhesive that had been heated to a liquid state. After the adhesive 20 has been applied, any folds or creases are pulled from the load bearing fabric 18 and it is placed onto the bonding fixture (not shown) with its peripheral edges laying in the adhesive 20. The upper bonding strip halves 14 for each of the bonding strip segments 12a–d are next placed atop fabric 18 immediately above the corresponding lower bonding strip halves 16. The fixture (not shown) is then clamped together to hold the fabric 18 in sandwiched relationship between the upper and lower bonding strip halves until the adhesive 20 is sufficiently cured. Once the adhesive 20 is sufficiently cured, the fixture is opened and the fabric and carrier assembly 10 can be removed. If desired, the fabric 18 can be held in a stretched position during attachment of the bonding strips 12a–d. This will provide a prestretched assembly (not shown), potentially eliminating the need to later stretch the fabric. If a prestretched assembly is desired, the fabric is preferably provided with an additional peripheral marginal portion that can be clamp or otherwise held by stretching apparatus during the bonding strip attachment process. The marginal material can be trimmed from the assembly after attachment of the bonding strips 12a–d.

Figure 3:
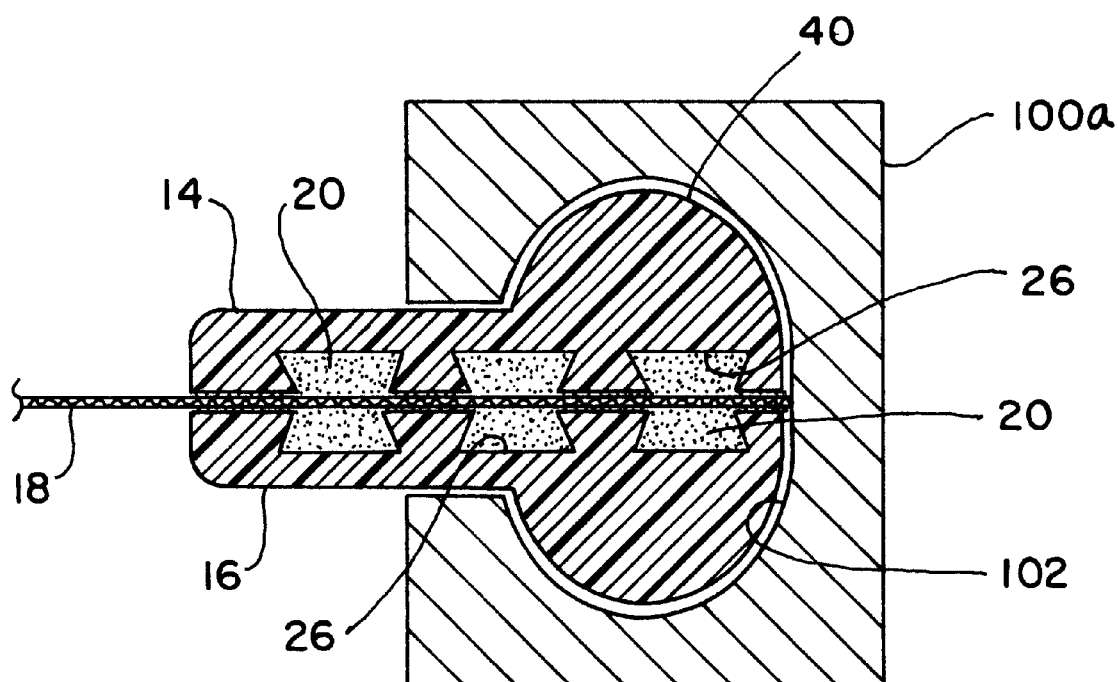
FIG. 3 is a sectional view of a preferred embodiment of the present invention attached to a support structure.

The fabric and bonding strip assembly 10 can then be attached to the support structure in a conventional manner, for example, by slidably interfitting the bonding strips 12a–d with the frame 100. As shown in FIG. 3, the bulbous edge 40 of the bonding strips 12a–d is preferably slidably fitted into the channels 102 in the corresponding segments of the peripheral frame 100. Preferably, bonding strips 12a and 12c are slidably fitted into channels 102 in frame segments 110a and 110c, respectively. Frame segments 110b and 110d are then slidably fitted over bonding strips 12b and 12d, and attached to segments 110a and 110c, for example, by screws 108.

Alternative Embodiments

Figure 4:
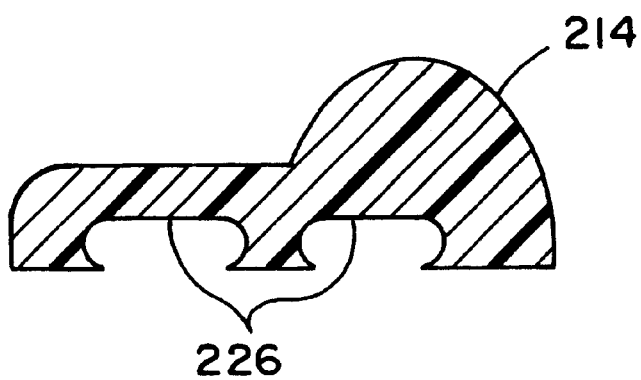
FIG. 4 is a sectional view of a first alternative bonding strip half.
Figure 5:
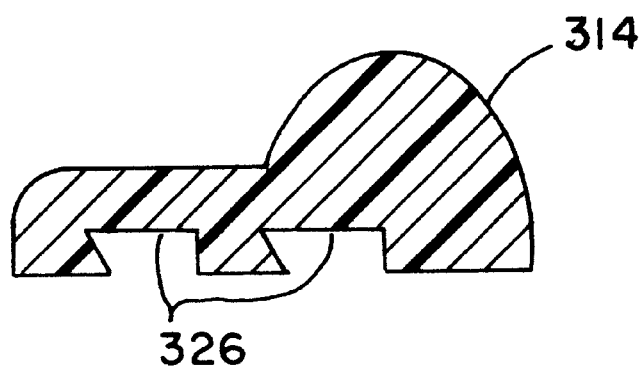
FIG. 5 is a sectional view of a second alternative bonding strip half.
Figure 6:
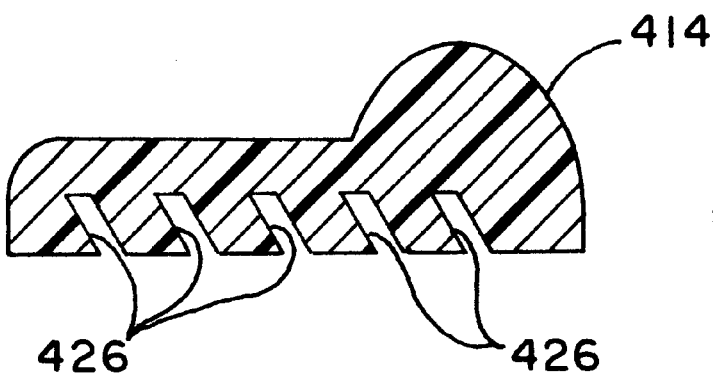
FIG. 6 is a sectional view of a third alternative bonding strip half.
Figure 7:
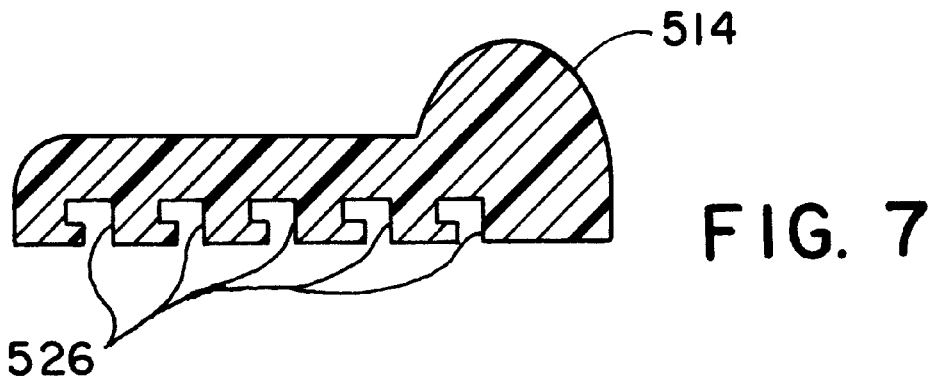
FIG. 7 is a sectional view of a fourth alternative bonding strip half.
Figure 8:
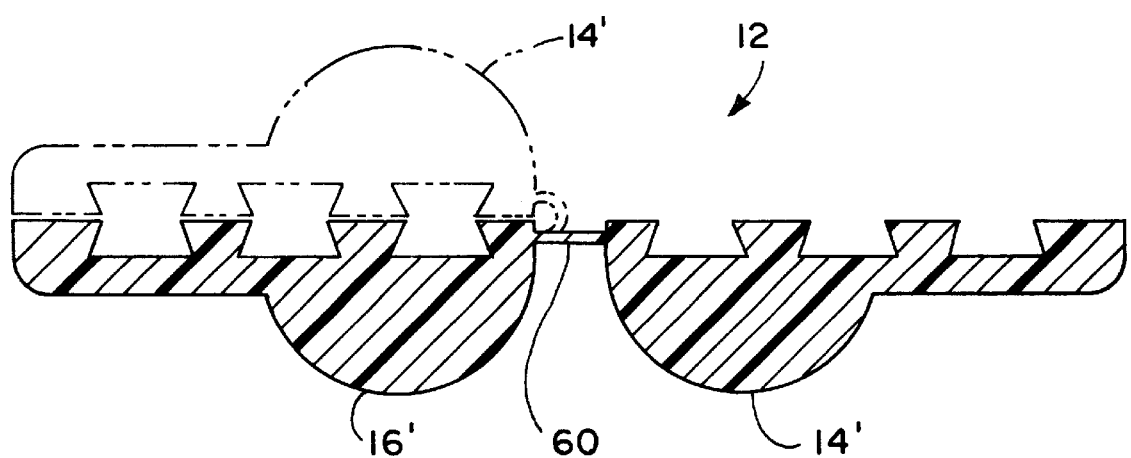
FIG. 8 is a sectional view of an alternative bonding strip.

An alternative embodiment of the present invention is shown in FIG. 8. In this embodiment, the bonding strip 12' is a single, one-piece component having a pair of bonding strip halves 14' and 16' that are joined together by a living hinge 60. The living hinge 60 is flexible enough to permit the two bonding strip halves 14' and 16' to be folded together to sandwich the fabric. The phantom lines of FIG. 4 show the bonding strip half 14' folded over onto bonding strip half 16'. The bonding strip 12' is preferably extruded, but may be molded, machined or otherwise manufactured using conventional techniques and apparatus.

Figure 9:
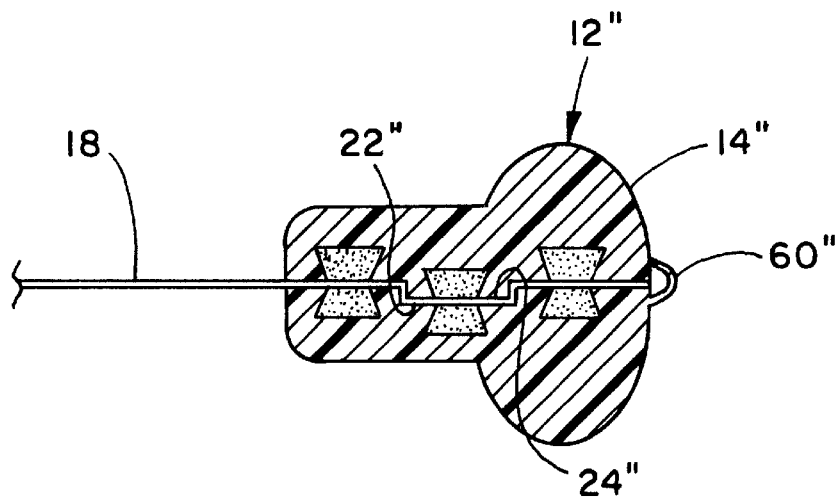
FIG. 9 is a sectional view of an assembly showing a further alternative bonding strip.

A second alternative embodiment of the present invention is shown in FIG. 9. In this embodiment, the bonding strip 12" is again a one-piece component having a pair of bonding strip halves 14" and 16" that are joined together be a living hinge 60". The bonding strip halves 14" and 16" each include a stepped or non-planar inner surface 22" and 24", respectively. The inner surfaces of the two halves correspond with one another to closely sandwich the fabric 18. The stepped surface helps to improve the mechanical bond between the fabric 18 and bonding strips 12".

Figure 10:
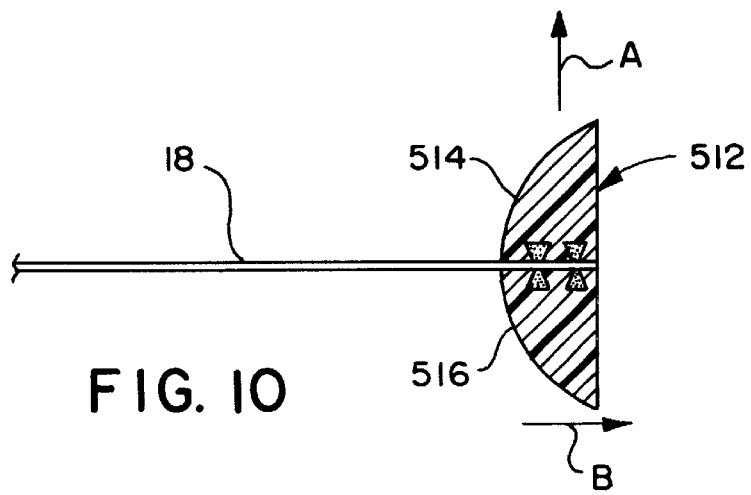
FIG. 10 is a sectional view showing a fifth alternative bonding strip adjacent an alternative frame.
Figure 11:
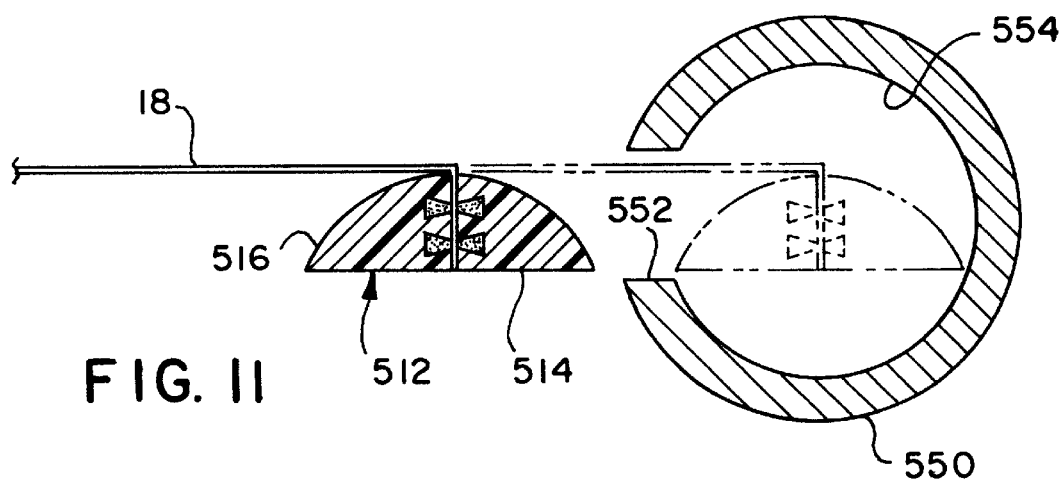
FIG. 11 is a sectional view showing the fifth alternative bonding strip rotated for insertion into the alternative frame.
Figure 12:
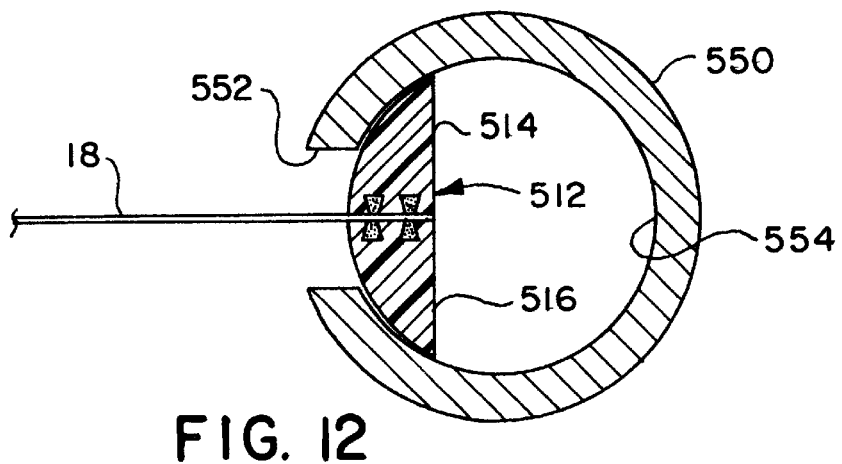
FIG. 12 is a sectional view showing the fifth alternative bonding strip installed in the alternative frame.

Another alternative embodiment of the present invention is shown in FIGS. 10–12. In this embodiment, the bonding strip 512 and frame 550 are configured to permit sideways installation of the bonding strip 512 within the frame 550. As shown in FIG. 10, the bonding strip 512 has greater dimensions in direction A (perpendicular to the fabric 18) than in direction B (parallel to the fabric 18). The frame 550 is configured so that its channel 554 is large enough to receive and permit rotation of the bonding strip 512. The mouth or opening 552 of the frame 550 is wider than the bonding strip 512 in direction B, but narrower than the bonding strip 512 in direction A. As a result, the bonding strip 512 can be rotated as shown in FIG. 11 and then inserted into the channel 554 through opening 552. FIG. 11 shows the bonding strip 512 within the frame 550 in phantom lines. Once within the channel 554, the bonding strip 512 can be rotated back into its original orientation, such that it is trapped within the frame 550 (See FIG. 12).

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

What is claimed is:

1. An assembly comprising:
    a load bearing fabric; and
    a bonding strip attached to said fabric by an adhesive, said bonding strip including first and second bonding strip halves, said bonding strip halves sandwiched about said fabric on opposite sides of said fabric, each of said bonding strip halves including an inner surface adjacent said fabric, each of said inner surfaces defining a longitudinally extended bonding groove, said bonding groove of said first bonding strip half being disposed immediately opposite said bonding groove of said second bonding strip half;
    wherein said adhesive is disposed between and adhesively bonded to said bonding strip halves, said adhesive extending through and being intimately intersecured with said fabric, said adhesive at least partially filling said bonding grooves such that said fabric is mechanically connected to said bonding strip.

2. The assembly of claim 1 wherein said bonding grooves are undercut in cross section.

3. The assembly of claim 1 wherein said fabric includes a peripheral margin; said bonding strip being secured to said fabric at said peripheral margin.

4. The assembly of claim 3 wherein said peripheral margin of said fabric defines a plane; said bonding strip halves each include an inner surface defining a plane extending parallel to said plane of said fabric.

5. The assembly of claim 4 wherein said bonding strip is a single piece with said bonding strip halves being integrally joined to one another along a living hinge, whereby said bonding strip halves are folded together to entrap said fabric.

6. An assembly comprising:
    a load bearing fabric;
    a pair of bonding strip portions disposed on opposite sides of said fabric; and
    an adhesive disposed between said bonding strip portions and extending through and being intimately intersecured with said fabric;
    wherein said bonding strip portions each include at least one of a bonding groove and a bonding protrusion for mechanically interconnecting said adhesive, said fabric and said bonding strip portions, at least one of a bonding groove and a bonding protrusion of said first bonding strip portion is disposed immediately opposite said at least one of a bonding groove and a bonding protrusion of said second bonding strip portion, said at least one of a bonding groove and a bonding protrusion is undercut in cross section.

7. The assembly of claim 6 wherein said fabric includes a peripheral margin; said bonding strip being secured to said fabric at said peripheral margin.

8. The assembly of claim 7 wherein said peripheral margin of said fabric defines a plane; said bonding strip portions each include an inner surface defining a plane extending parallel to said plane of said fabric; and
    said at least one of a bonding groove and a bonding protrusion being a bonding groove, said bonding groove being recessed from said plane of said inner surface.

9. The assembly of claim 7 wherein said bonding strip portions are integrally joined to one another along a living hinge, whereby said bonding strip halves are folded together to entrap said fabric.

10. The assembly of claim 6 wherein said bonding strip portions each include an inner surface facing said fabric, said inner surface being stepped whereby a portion of said fabric disposed between said bonding strip portions is non-planar.

11. A method for attaching a load bearing fabric to a support structure, comprising the steps of:
    providing a pair of bonding strip halves, each defining at least one of a bonding groove and a bonding protrusions configured to mechanically interconnect with an adhesive, said providing step including extruding the bonding strip halves from an elastomeric material, said extruding step including extruding the bonding strip halves as a single piece joined together along a living hinge, said providing step including providing the bonding strip halves with bonding grooves, whereby the adhesive at least partially fills the bonding groove to provide a mechanical interconnection between the adhesive and the bonding strip half, said providing step includes providing the bonding strip halves with bonding grooves that are undercut in crosssection;

applying an adhesive to at least one of the bonding strip halves;

closing the bonding strip halves about the fabric, said closing step including folding a first bonding strip half over onto a second bonding strip half along the living hinge;

permitting the adhesive to cure, thereby forming an adhesive and a mechanical interconnection between the fabric, the adhesive and the bonding strip halves; and securing the bonding strip to the support structure.

12. A method for attaching a load bearing fabric to a support structure, comprising the steps of:

providing a pair of bonding strip halves, each defining at least one of a bonding groove and a bonding protrusions configured to mechanically interconnect with an adhesive, said providing step including extruding the bonding strip halves from an elastomeric material, said extruding step including extruding the bonding strip halves as a single piece joined together along a living hinge, said providing step including providing the bonding strip halves with bonding grooves, whereby the adhesive at least partially fills the bonding groove to provide a mechanical interconnection between the adhesive and the bonding strip half, at least one bonding groove of the first bonding strip half being disposed directly opposite of at least one bonding groove of the second bonding strip half;

applying an adhesive to at least one of the bonding strip halves;

closing the bonding strip halves about the fabric, said closing step including folding a first bonding strip half over onto a second bonding strip half along the living hinge;

permitting the adhesive to cure, thereby forming an adhesive and a mechanical interconnection between the fabric, the adhesive and the bonding strip halves; and securing the bonding strip to the support structure.

13. A method for attaching a load bearing fabric to a support structure, comprising the steps of:

placing a first bonding strip portion in a fixture, the first bonding strip portion defining a longitudinally-extended bonding groove;

applying an adhesive to the first bonding strip portion, the adhesive at least partially filling the bonding groove;

positioning a load bearing fabric on the fixture, the load bearing fabric overlying the first bonding strip portion, whereby the adhesive flows through the fabric;

placing a second bonding strip portion atop the fabric immediately above the first bonding strip portion, the second bonding strip portion defining a longitudinally-extended bonding groove, whereby the adhesive at least partially fills the bonding groove of the second bonding strip portion;

clamping the bonding strip portions together about the fabric;

permitting the adhesive to cure, thereby forming an assembly of the bonding strip portions and the fabric with mechanical and adhesive connections between the fabric, the adhesive and the first and second bonding strip portions;

removing the assembly from the fixture; and securing the assembly to the support structure.

14. The method of claim 13 wherein said second placing step includes placing the second bonding strip portion so that the bonding groove of the second bonding strip portion is disposed opposite to and immediately above the bonding groove of the first bonding strip portion.

15. The method of claim 14 wherein the bonding groove is undercut in cross-section.

16. The method of claim 15 wherein the fabric includes a peripheral marginal portion, the positioning step including the step of placing the fabric on the fixture such that the peripheral marginal portion overlies the first bonding strip portion.

17. The method of claim 14 wherein the bonding strip includes a first dimension in a first direction and a second dimension in a second direction, the support structure defining a channel and a mouth, the mouth having a dimension smaller than said first dimension and greater than said second dimension; and wherein said securing step includes the steps of:

orienting the bonding strip a first position wherein the second dimension of the bonding strip is aligned with the mouth such that the bonding strip can be inserted into the channel through mouth;

inserting the bonding strip through the mouth into the channel;

orienting the bonding strip is a second position while the bonding strip is within the channel, wherein the first dimension is aligned with the mouth such that the bonding strip is trapped within the channel.

* * * * *